United States Patent [19]
Glawion

[11] Patent Number: 5,458,862
[45] Date of Patent: Oct. 17, 1995

[54] PROCESS FOR PURIFYING EXHAUST GASES, ESPECIALLY FROM VACUUM PYROLYSIS INSTALLATIONS

[75] Inventor: Erwin Glawion, Grossostheim, Germany

[73] Assignee: Rieter Automatik GmbH, Germany

[21] Appl. No.: 146,130

[22] PCT Filed: Mar. 12, 1993

[86] PCT No.: PCT/EP93/00574

§ 371 Date: Jun. 6, 1994

§ 102(e) Date: Jun. 6, 1994

[87] PCT Pub. No.: WO/93/1779

PCT Pub. Date: Sep. 16, 1993

[30] Foreign Application Priority Data

Mar. 13, 1992 [DE] Germany .......................... 42 08 151.3

[51] Int. Cl.[6] .................................................. B01D 53/36
[52] U.S. Cl. ................. 423/245.3; 422/169; 422/170; 422/173; 422/177; 422/198; 422/199; 422/174; 431/7; 431/11; 431/207; 110/214; 110/215; 110/216
[58] Field of Search .................... 422/169–175, 422/177, 198–199; 423/245.3; 431/7, 11, 207; 110/214, 215–216, 345–346

[56] References Cited

U.S. PATENT DOCUMENTS

| | | | |
|---|---|---|---|
| 3,768,982 | 10/1973 | Kitzner | 422/180 |
| 4,564,174 | 1/1986 | Sikander | 266/149 |
| 4,625,661 | 12/1986 | Melchior | 110/241 |
| 4,930,997 | 6/1990 | Bennett | 418/178 |
| 4,958,578 | 9/1990 | Houser | 110/216 |
| 5,000,098 | 3/1991 | Ikeda et al. | 110/214 |
| 5,213,492 | 5/1993 | Ho | 110/214 |
| 5,333,558 | 8/1994 | Lees, Jr. | 110/346 |

FOREIGN PATENT DOCUMENTS

| | | |
|---|---|---|
| 0385411 | 9/1990 | European Pat. Off. . |
| 0485787 | 5/1992 | European Pat. Off. . |
| 2637169 | 2/1978 | Germany . |
| 2747578 | 4/1979 | Germany . |
| 4003668 | 8/1990 | Germany . |
| 3906430A1 | 9/1990 | Germany . |
| 4014517 | 11/1991 | Germany . |
| 3243813 | 7/1993 | Germany . |

*Primary Examiner*—Robert J. Warden
*Assistant Examiner*—Hien Tran
*Attorney, Agent, or Firm*—Banner & Allegretti, Ltd.

[57] ABSTRACT

A process for purifying exhaust gases, especially from vacuum pyrolysis installations by means of the extraction of the exhaust gases and their combustion with a supply of air. Immediately after their formation, the exhaust gases are subjected to complete combustion with a controlled air supply and an under pressure of 0.5 to 0.95 bar (500 to 50 mbar absolute) generated by a vacuum pump, whereupon the gaseous reaction products are cooled to 10° to 25° C. to prevent damage to the vacuum pump and then the cooled gaseous reaction products are extracted by the vacuum pump.

14 Claims, 3 Drawing Sheets

PROCESS FOR PURIFYING EXHAUST GASES, ESPECIALLY FROM VACUUM PYROLYSIS INSTALLATIONS

The invention relates to a process for purifying exhaust gases, especially from vacuum pyrolysis installations, by means of the extraction of the exhaust gases and their combustion with a supply of air.

To date such exhaust gases have been extracted and subsequently subjected to their own combustion, whereupon the gaseous combustion products were released into the atmosphere. Depending on the exhauster, there exists the possibility on a larger or smaller scale that the exhaust gases with their possibly harmful components will have a negative impact on the exhauster, especially an operating medium used in the exhauster, e.g. water or oil. The negative effect on the operating medium goes so far that the operating medium has to be disposed as special waste, and thus legal provisions for disposal of special waste, which have to be initiated, as a rule, with an approval process, are applied. In any case this represents a significant complication of the prior art process.

The invention is based on the problem of designing the purification of the exhaust gases in such a manner that neither the exhauster nor any operating medium in the exhauster can be negatively effected. This problem is solved by application's invention.

Preferably the exhaust gases are exhaust gases from vacuum pyrolysis installations, preferably toluene and/or benzene, and exhaust gases from extrusion processes, preferably monomers, such as caprolactam, and/or oligomers, preferably the short-chained, more complex compounds of monomers are from polymer melts.

By means of the combustion of the exhaust gases safe combustion products, preferably $CO_2$ and/or $H_2O$ are produced both for the exhauster and an operating medium used therein. So that at this stage the high temperatures of the combustion products resulting from the combustion of the exhaust gases cannot damage the exhauster, which is designed here as a vacuum pump, immediately following the formation of the combustion products (gaseous reaction products) there is a cooling step that provides that the gaseous reaction products are cooled so far, viz. to 10° to 25° C., that they can no longer damage a vacuum pump that follows. The vacuum pump is preferably a liquid ring vacuum pump. In a preferred embodiment a slide vane rotary pump is used. For purposes of a slide vane rotary pump the range of cooling is expanded to 10° to 200° C., preferably 100° to 200° C. Following the combustion of the exhaust gases to innocuous, gaseous reaction products, whereby the combustion takes places at an underpressure of 0.5 to 0.95 bar (500 to 50 mbar absolute) that is generated by the vacuum pump, and the subsequent cooling of the gaseous reaction products, then the gaseous reaction products can no longer cause any damage to the vacuum pump, so that the cooled gaseous reaction products and the cooling water from the spray condenser can be extracted with the vacuum pump and can be released into the open air. For purposes of a slide vane rotary pump, the range of underpressure, which is generated by the vacuum pump, expands to 0.5 to 0.99 bar (500 to 10 mbar absolute).

The aforementioned liquid ring vacuum pumps belong in general to the group of displacement pumps. The gas to be extracted is conveyed in these pumps with the aid of circulating liquid, the liquid ring. This type of vacuum pump is suitable for conveying gases and steams of virtually any kind, provided a suitable liquid (i.e. operating medium)—water in the normal case—is chosen to form the liquid ring. In the present invention water is preferred.

An impeller is arranged eccentrically in a cylindrical housing filled in part with liquid. Owing to the rotation of the impeller, the liquid forms a ring rotating concentrically to the axis of the housing. It is achieved with this arrangement that the operating liquid leaves piston-like from the wheel cells and re-enters. As a consequence of the rotating impeller, these gases and steams are conveyed in the direction of rotation, whereby the cells decrease again. The gases and steams that are pumped off are compressed and ejected from the inside of the pump with a portion of the operating mediums.

The heat produced with the operation of the pump is emitted by way of the operating medium, for which reason new operating medium has to be delivered continuously for cooling. The mixture of operating medium and gas is separated again in a subsequent liquid separator (i.e. separator), during which process a portion of the operating medium can be conveyed again to the vacuum pump.

In a less preferred embodiment of the invention, in which a liquid ring vacuum pump with, e.g. water or oil as operating medium is used, the gaseous reaction products are cooled after their formation to a temperature, which is higher than 25° C., e.g. 30° to 40° C. Therefore, this embodiment is less preferred, since cavitation in the pump can occur, thus decreasing the vacuum in the pump and damaging the pump in the long run.

The aforementioned slide vane rotary pump functions, as the name already suggests, according to the slide vane rotary principle. An eccentrically mounted rotor rotates in a cylinder. By means of the centrifugal force of the rotary motion, the slide vanes, which slide in slots in the rotor, are pressed against the cylinder wall, whereby the slide vanes divide the crescent-shaped space between cylinder and rotor into chambers. When the chambers are connected to the suction channel, the gas is sucked in, with more rotation compressed, and finally ejected with the operating medium into an operating medium separator and separated there again from said separator. The operating medium, preferably oil, collects at the bottom in the separator and is injected again into the compression space (circulation system lubrication). The outgoing air which is without any operating medium is then released to the atmosphere.

Therefore, the process according to the invention can be used continuously for cleaning exhaust gases without any danger to the organs contained in it. In a less preferred embodiment the process according to the invention is used discontinuously.

Preferably the combustion of the exhaust gases with controlled supply of air is conducted in the case of a heavy metal and chlorine-free exhaust gas in the presence of a catalyst at temperatures ranging from 350° to 500° C.; for exhaust gases with catalytic poisons such as heavy metal and chlorine compounds, thermally at temperatures ranging from 850° to 1200° C. Suitable catalyst is primarily a metal substrate coated with platinum, preferably similar to an autocatalyst, which is suitable preferably for oxidation of aliphatic and aromatic hydrocarbons with up to 7 carbon atoms.

After cooling, the gaseous reaction products can be passed in an advantageous manner through a separator, which separates from the gas stream specific water-soluble gases together with the operating medium, discharged from the vacuum pump, and the extracted cooling water from the spray condenser.

For cooling, a spray condenser or a heat exchanger can be used in an advantageous manner, where the latter renders the heat emitted in it useable again as energy.

The device to implement the process is designed expediently in such a manner that its individual organs are arranged in the sequence combustion—system, cooling device and vacuum pump, where the vacuum pump receives the gaseous reaction products as already cooled and can no longer be damaged by said reaction products.

Expediently a high temperature furnace can be used as the combustion system. If a catalyst is used, said catalyst can be designed expediently in such a manner that an air heating apparatus with heating wires is arranged in front of the catalyst.

BRIEF DESCRIPTION OF THE DRAWINGS

Embodiments of the invention are shown in the Figures.

Figure 1:
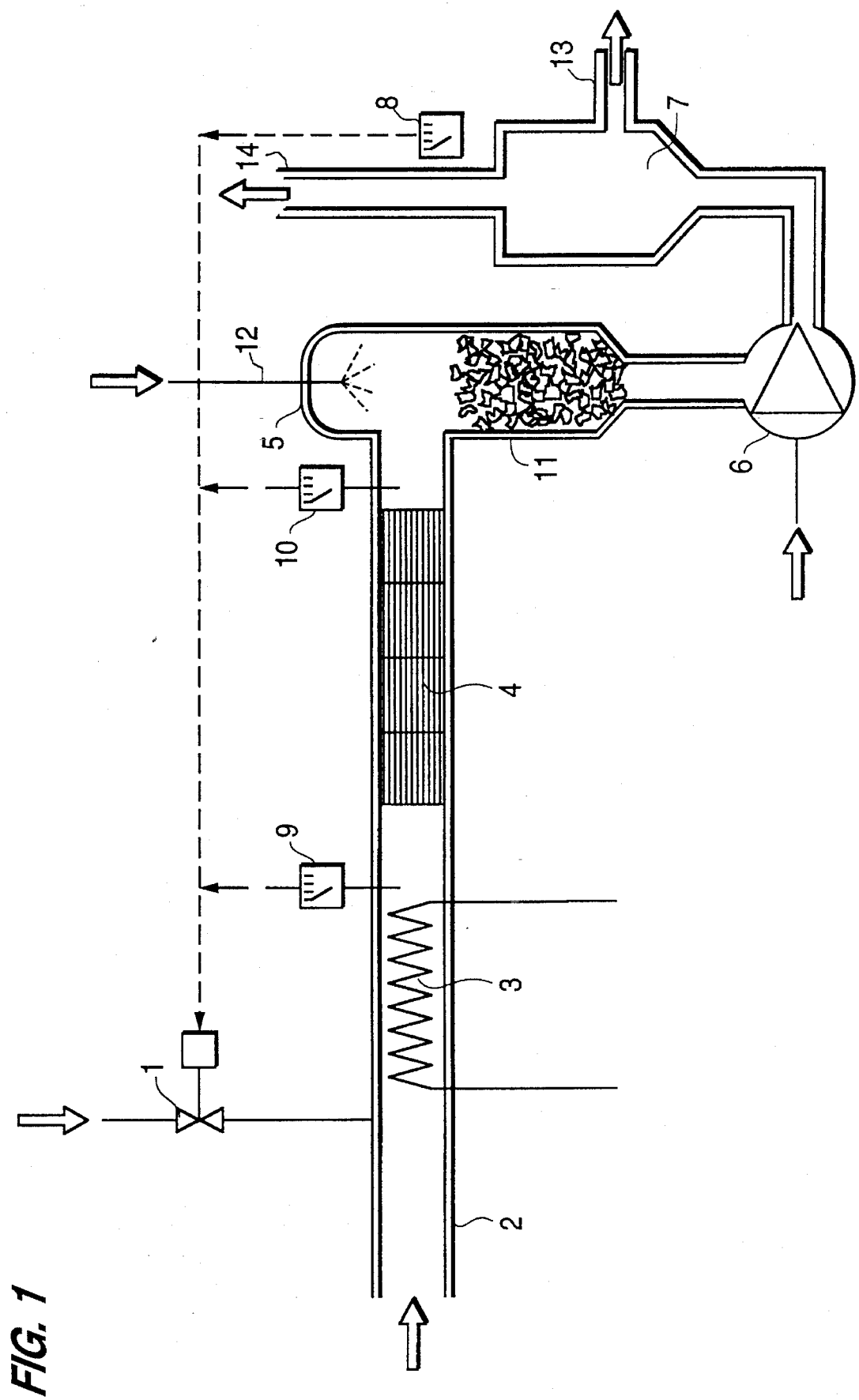
FIG. 1 is a device for catalytic purification of exhaust gases.

The device depicted in FIG. 1 and designed for purifying exhaust gases contains the vacuum-sealed pipe 2, through which the exhaust gases to be purified are conveyed (see drawn arrow). Air is conveyed to the pipe 2 by way of a control valve 1, in order to generate in the pipe 2 a gas mixture, which is necessary for combustion and contains an adequate amount of oxygen. The pipe 2 has the electric air heating apparatus 3, which is designed as an electric heating coil and which heats the gas mixture which is passed through up to a temperature ranging from 350° to 500° C. which is necessary for the catalytic combustion. As an alternative only the air conveyed by way of the control valve 1 can also be heated with an air heating apparatus and can be mixed with the exhaust gases to be purified (not illustrated). To avoid energy losses, the pipe 2 is provided with thermal insulation. In the direction of flow behind the air heating apparatus 3 there is installed the temperature probe 9, which indicates the temperature of the gases and subject to the effect of the control valve 1 controls and monitors the air heating apparatus 3 in order to avoid overheating and damage to the air heating apparatus 3 and the following catalyst 4. Thus the following catalyst 4 always has optimal air temperatures in order to reach optimal combustion values.

The gases heated thus flow into the region of the catalyst 4, in which the catalytic combustion of the supplied gases takes place, thus forming chemically innocuous reaction products. Since the gas temperature rises due to combustion, another temperature probe 10 is provided whose signal is used in a manner analogous to the signal of the temperature probe 9 so that damage to the catalyst 4 and inadequate combustion of the gases is avoided. Then the reaction products flow into the spray condenser 5, which is filled partially with fillers 11, e.g. Rasching rings, with which the surface acting on the supplied gases is correspondingly raised. Water, which is atomized inside the spray condenser 5, is conveyed through a feed pipe 12 to the spray condenser 5, thus resulting in the desired cooling effect for the supplied gases. The vacuum pump 6, with which an underpressure ranging from 0.5 to 0.95 bar (500 to 50 mbar absolute) is generated in the region of the combustion and the spray condenser 5, is connected downstream of the spray condenser 5. For purposes of a slide vane rotary pump this range is expanded to 0.5 to 0.99 bar (500 to 10 mbar absolute). The separator 7, which can separate from the gas stream the liquid, which comprises specific water-soluble gases and the operating medium, discharged from the vacuum pump, and extracted cooling water from the spray condenser, is attached to the output of the vacuum pump 6. The mixture of gas and liquid coming into the separator 7 is separated in such a manner that the liquid flows off with the gases dissolved therein by way of a connecting piece 13. Gases that are not dissolved in the liquid are discharged by way of the connecting piece 14. For safety reasons the temperature is measured by means of the measuring instrument 8, which measures the concentration of the unburned gases, and thus monitors and controls by way of feedback with the control valve 1 the portion of explosive, combustible or convertable portions of the combustion residues.

To automate the operational sequence in the device, the measurement results of the temperature probes 9 and 10 and the measuring instrument 8 can be combined by way of a computer, which can derive from the linkage of the measurement results a signal, which controls the control valve 1 in such a manner that the amount of air required for the combustion is supplied at any time.

Figure 2:
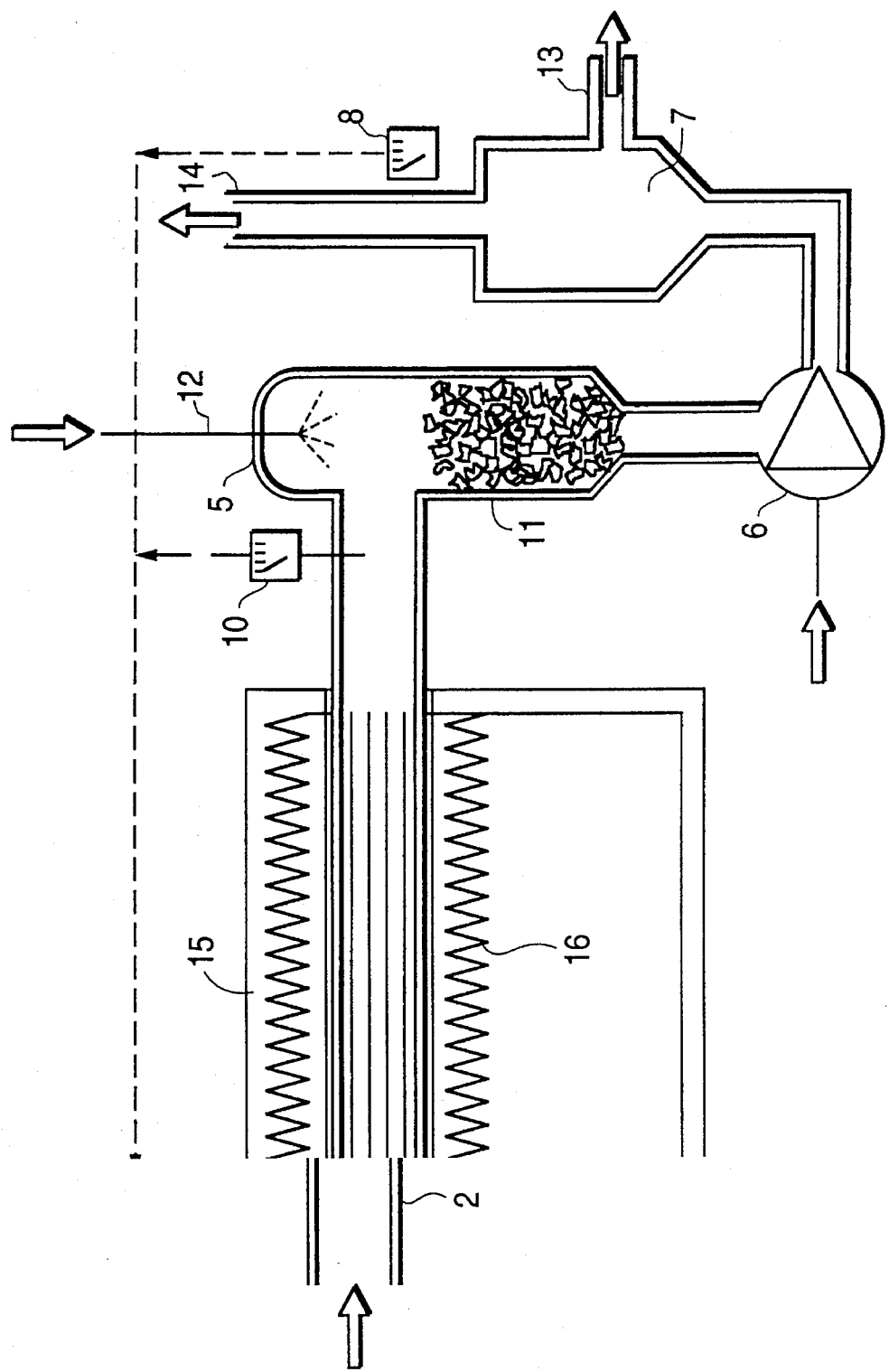
FIG. 2 is a device for purifying exhaust gases with thermal combustion.

The device depicted in FIG. 2 involves the use of thermal combustion. Apart from that, the device according to FIG. 2 has the same components as the device in FIG. 1, for which reason components used in the same manner are provided with the same reference numerals in both Figures.

The exhaust gases delivered by way of pipe 2 are led here through the high temperature furnace 15, which is heated by means of the electric heater 16 to a temperature ranging from 850° to 1200° C. The thermal combustion of the exhaust gases takes place in the region of the high temperature furnace 15; then said exhaust gases are subjected to cooling and separation, as in the case of the device according to FIG. 1. Even with a device according to FIG. 2 it is possible to combine the measurement results of the measuring instrument 8 and the temperature probe 10, in order to derive a control signal for the control valve 1.

Figure 3:
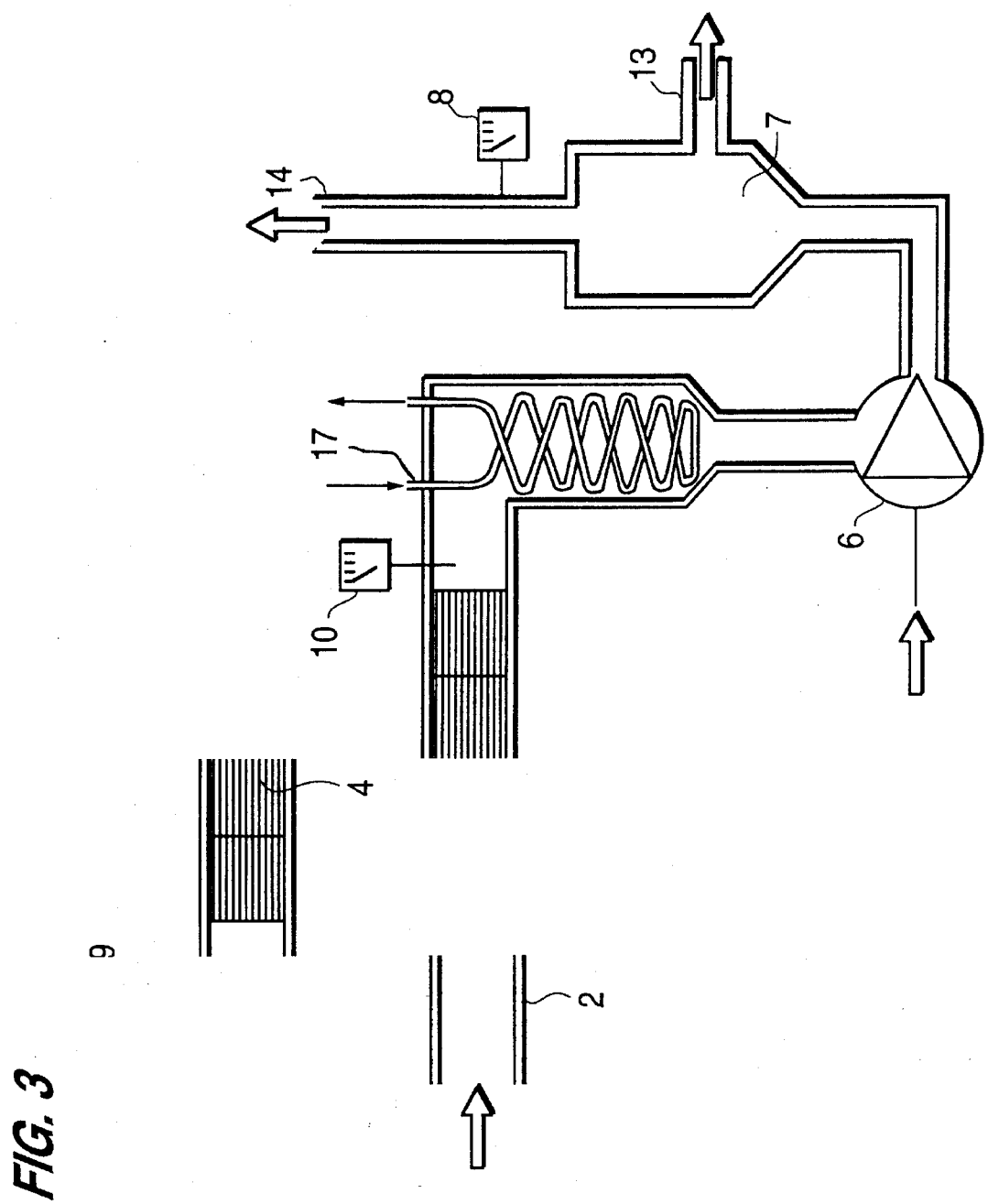
FIG. 3 is a device for catalytic purification of exhaust gases, where a heat exchanger is provided for cooling.

The device depicted in FIG. 3 is a device for catalytic purification of exhaust gases according to FIG. 1, wherein, however, instead of the spray condenser 5, there is a heat exchanger 17 to cool the gaseous reaction products. Apart from that, the components are identical to the ones shown in FIG. 1, for which reason components used in the same manner are provided with the same reference numerals in both Figures.

In general a spray condenser or heat exchanger is suitable for cooling the gaseous reaction products, using a liquid ring vacuum pump, whereas with the use of a slide vane rotary pump a heat exchanger is preferred.

In the following the cooling of the gaseous reaction products and the subsequent steps are described in detail. In a preferred embodiment, in which a liquid ring vacuum pump, preferably a water ring vacuum pump, is used, the reaction products, cooled in the spray condenser by means of water, and the water are delivered into the vacuum pump. In this type of a vacuum pump water, preferably water that comes from the condenser, serves as the operating medium. The water is thrown by means of centrifugal force against the inside wall of the pump and forms on this wall a sealing layer. In this embodiment the operating medium of the pump is mixed, therefore, without fail with the condensate products; for which reason in the prior art it also results in a deleterious manner in the operating medium being polluted.

The operating medium and the reaction products are conveyed through the pump. Finally this operating medium is separated from the gaseous reaction products in the separator.

As aforementioned, the invention can also be implemented using a slide vane rotary pump. Compared to the liquid ring vacuum pumps, such pumps operate with a different operating medium (for sealing), preferably oil. Since such a pump exhibits a higher operating temperature, preferably over 100°, a heat exchanger is provided preferably for cooling the gaseous reaction products. Owing to the higher operating temperature of the slide vane rotary pump, the gaseous reaction products exist exclusively as gases, including water as a water vapor, which can be released to the atmosphere. The oil conveyed together with the cooled reaction products through the pump is now recovered in the separator and fed back to the pump. By recycling the oil, up to 99.9% of the oil can be recovered.

In principle the present invention is suitable for purifying exhaust gases originating from an installation that requires a relatively high underpressure.

It must also be pointed out that the entire purification process takes place in a closed system, so that the purification of the exhaust gases is conducted in a manner that is optimal for the environment. Therefore, the significance of this invention must also be judged in connection with the increasing efforts in the domain of environmental protection. Vacuum pyrolysis installations have required a permit pursuant to the legislation (TA-Air, 5 Bm SchG [Technical specifications for maintaining clean air—First general administrative regulations concerning Federal law on the protection against harmful effects on the environment]). To date proposals for after-treatment of the substances (especially residual gases) conveyed by the pump have been tried, e.g. by means of activated charcoal filters; however, these proposals usually fail on account of the required expense in proportion to the obtainable results. Thus, to date none of the past proposals promise a solution both to the exhaust gas problem and also the Water pollution.

I claim:

1. A process for purifying and extracting exhaust gases at underpressure conditions generated by a vacuum pump comprising:

(a) mixing the exhaust gases with a controlled air supply;

(b) subjecting the mixture of exhaust gases and air of step (a) to combustion at an underpressure ranging from about 0.5 to about 0.99 bar generated by a vacuum pump to obtain gaseous reaction products;

(c) cooling the gaseous reaction products before said gaseous reaction products are conveyed in the vacuum pump to a temperature sufficient to essentially preclude damage to the vacuum pump; and (d) extracting the cooled gaseous reaction products.

2. The process of claim 1, wherein the gaseous reaction products are cooled to a temperature between about 10° and about 200° C.

3. The process of claim 2 wherein the combustion takes place at an underpressure ranging from about 0.5 to about 0.95 bar and the gaseous reaction products are cooled to a temperature between about 10° and about 25° C.

4. The process of claims 2 or 3, wherein the combustion is conducted at temperatures ranging from about 850° to about 1200° C.

5. The process of claim 4 wherein the cooled gaseous reaction products are extracted in the form of a mixture of a gas stream and a liquid, and further the process comprises:

(e) separating the gas stream from the liquid and any soluble gases dissolved in the liquid.

6. The process of claims 2 or 3, wherein the combustion is conducted in the presence of a catalyst at temperatures ranging from about 350° to about 500° C.

7. The process of claim 6, wherein the catalyst comprises a metal substrate coated with platinum.

8. The process of claim 6 wherein the cooled gaseous reaction products are extracted in the form of a mixture of a gas stream and a liquid, and the process further comprises:

(e) separating the gas stream from the liquid and any soluble gases dissolved in the liquid.

9. A system for purifying and extracting exhaust gases at underpressure conditions comprising:

(a) a chamber for mixing the exhaust gases and a controlled supply of air;

(b) means for combusting the exhaust gases and air mixed in the chamber to produce gaseous reaction products;

(c) a vacuum pump means in communication with the mixing chamber for generating an underpressure within the system ranging from at least about 0.5 to at least about 0.99 bar;

(d) means in communication with the mixing chamber for cooling the gaseous reaction products to a temperature at which said products will not cause damage to the vacuum pump means; and (e) means for extracting the cooled gaseous reaction products from the cooling means.

10. The system of claim 9 wherein the means for combusting the exhaust gases and air is a high temperature furnace.

11. The system of claim 9 wherein the means for combusting the exhaust gases comprises a heating apparatus and a means for catalytic combustion.

12. The system of claim 11 wherein the means for catalytic combustion includes a catalyst comprising a metal substrate coated with platinum.

13. The system of claims 9, 10, 11 or 12 wherein the cooling means is constructed and arranged to cool the gaseous reaction products to a temperature between about 10° and about 200° C.

14. The system of claim 13 wherein the vacuum pump means is constructed and arranged to generate the underpressure in the range from at least about 0.5 to about 0.95 bar and the cooling means is constructed and arranged to cool the gaseous reaction products to a temperature between about 10° and 25° C.

* * * * *